C. VAN VLECK.
Log-Turners.

No. 141,969.

Patented August 19, 1873.

Witnesses.
D. P. Cowl
Edmund Masson

Inventor.
Charles Van Vleck,
By atty. A. B. Stoughton.

AM. PHOTO-LITHOGRAPHIC CO. N.Y. (OSBORNE'S PROCESS)

UNITED STATES PATENT OFFICE.

CHARLES VAN VLECK, OF SIDNEY, MICHIGAN.

IMPROVEMENT IN LOG-TURNERS.

Specification forming part of Letters Patent No. 141,969, dated August 19, 1873; application filed July 26, 1873.

*To all whom it may concern:*

Be it known that I, CHARLES VAN VLECK, of Sidney, in the county of Montcalm and State of Michigan, have invented certain new and useful Improvements in Log-Turners in Saw-Mills and other places; and I do hereby declare the following to be a full, clear, and exact description of the same, reference being had to the accompanying drawings making a part of this specification, in which—

Figure 1:
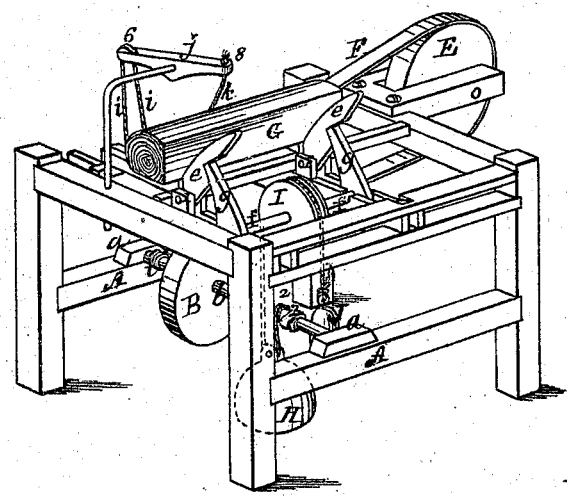
Figure 2:
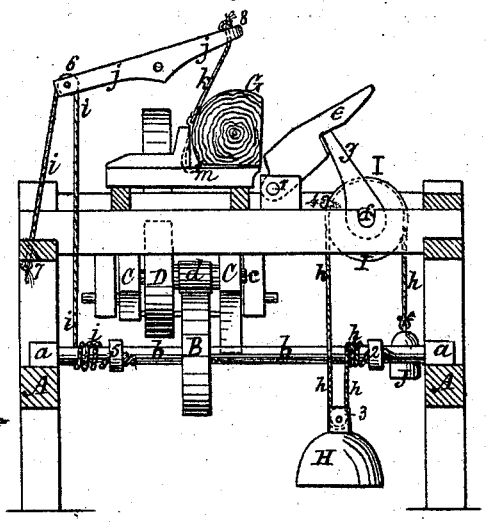
Figure 3:
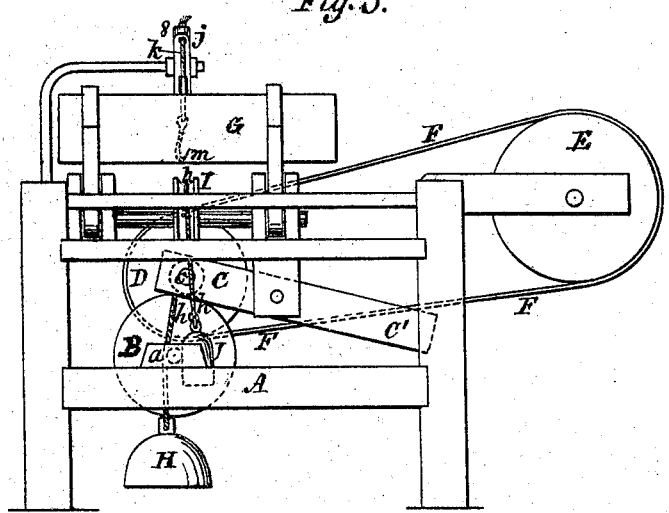

Figure 1 represents the apparatus in perspective. Fig. 2 represents an end view with the frame in section. Fig. 3 represents a side elevation.

Similar letters of reference, where they occur in the separate figures, denote like parts of the apparatus in all of the drawings.

My invention relates to an apparatus for turning logs in saw-mills, which, upon being thrown into action by the operator, is then driven by the power that drives the saws, and automatically turns the log, and then runs back into position for another similar and successive operation.

To enable others skilled in the art to make and use my invention, I will proceed to describe the same with reference to the drawings.

In suitable bearings $a$, upon the frame A, is placed a turning-shaft, $b$, having upon it a fast pulley or wheel, B. In a swing-frame C, a portion, $C^1$, of which projects far enough beyond its pivotal connection to form a lever easily grasped by the operator, there is a pulley, D, over and around which, and over and around a pulley, E, on the main frame, passes an endless belt or band, F, by which the apparatus is driven. The power to drive the pulley E may be taken from that which drives the saw-mill. The pulley D is fast on its shaft $c$, so that said pulley and shaft shall turn together. Upon the shaft $c$ there is a friction-wheel, $d$, which, when in contact with the pulley B on the shaft $b$, drives said pulley and shaft; and by means of the lever $C^1$ the operator may increase the frictional contact between the wheels $d$ B, to insure the motion and power necessary, or remove it, at pleasure, leaving the pulley B and its shaft $b$ free for a reversed motion by other appliances, as will be explained.

Near the carriage, upon which the log to be sawed rests, are two inclines, $e$ $e$, which are pivoted at 1 so as to be raised or lowered, as occasion may require; and upon a shaft, $f$, behind these inclines, are two lifters, $g$ $g$, that work in connection with the inclines, to raise, hold up, and to let down said inclines at the proper times. To the shaft $b$, at the point 2, is fastened one end of a chain or rope, $h$, which has two or three turns around said shaft, and thence passes down and under a pulley, 3, in the top of a weight, H; thence upward to a pulley-wheel, I, on the shaft $f$, to which pulley-wheel the chain or rope is fastened, as at 4, and, thence passing over said pulley, is fastened to a weight, J. At the opposite end of the shaft $b$, as at 5, is fastened a second chain or rope, $i$, which, after two or three turns around said shaft, passes up and over a pulley, 6, in the end of a beam-lever, $j$, and thence to some permanent point, as at 7, where it is fastened. In the opposite end of the beam-lever $j$, as at 8, is fastened a chain or rope, $k$, upon the lower end of which is a cant-hook, $m$, for taking hold of the log G.

When the log G is to be turned the operation is as follows: The attendant first puts the cant-hook under the lower side of the log, and at the side opposite to that on which it is to be turned. The friction driving-wheel $d$ is then pressed down upon the perimeter of the pulley B, which rotates said pulley as well as its shaft $b$. As the shaft $b$ turns it winds up the chain or rope $h$ upon itself, and as the shaft $f$ and its pulley I and lifters $g$ are more easily moved than the overpoise-weight H is, the former move until the lifters $g$ have raised up the inclines $e$, as seen in Fig. 2, and until the lifters come against the shoulders 9 of the inclines, and go no farther. The winding of the chain or rope $h$ being continued, it then raises up the overpoise-weight H, while the lifters and inclines remain stationary. While the lifters and inclines are being operated by the chain or rope $h$, the other chain or rope $i$ at the other end of the shaft $b$ is also being wound up, but it is only the necessary slack of the chain $i$ that is wound up until the lifters and inclines are first arranged; and until the overpoise-weight H begins to be raised the chain $i$ is not strained up. But at this period the chain $i$, drawing down one end of the swing beam-lever $j$, causes the other end with its chain and hook to turn the log G over onto the inclines $e$, whence it slides back onto the carriage in its turned condition. When the log is turned the friction driving-wheel $d$ is raised from the pulley; the falling of the weight H turns the shaft $b$ and slackens the chains $h\ i$, and then the weight J turns back the pulley I, and its shaft $f$ throws back the lifters $g$, and the inclines $e$ drop down with them out of the way. The apparatus is now in condition for another similar operation.

Having thus fully described my invention, what I claim therein as new, and desire to secure by Letters Patent, is—

1. In combination with the driven shaft $b$, the chain or rope $h$, overpoise H, shaft $f$ with its lifters and pulley, and weight J, for the double purpose of first raising up the inclines $e$ to receive the turned-over log, and then to return them into a position out of the way, as described and represented.

2. In combination with the shaft $b$, turned in opposite directions at different times, as stated, the chain or rope $i$, beam-lever $j$, and chain or rope $k$ with its hook $m$, as and for the purpose described and represented.

CHAS. VAN VLECK.

Witnesses:
G. F. CASE,
JOHN VAN VLECK.